United States Patent Office 3,562,732
Patented Feb. 9, 1971

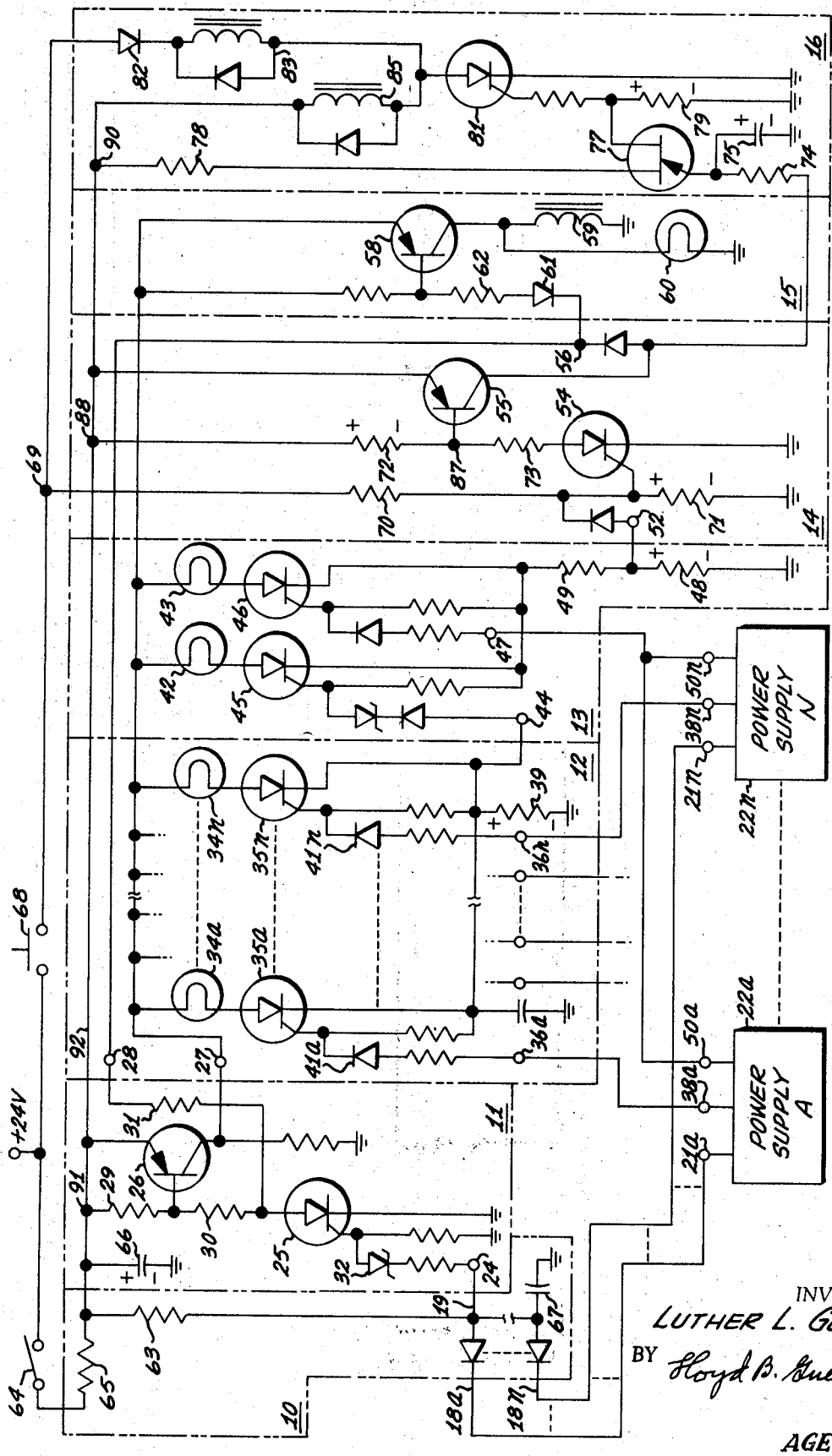

3,562,732
FAULT REGISTER AND SEQUENCER FOR USE
WITH A PLURALITY OF POWER SUPPLIES
Luther L. Genuit, Scottsdale, Ariz., assignor to General
Electric Company, a corporation of New York
Filed Oct. 17, 1968, Ser. No. 768,437
Int. Cl. G08b 23/00
U.S. Cl. 340—248
12 Claims

ABSTRACT OF THE DISCLOSURE

A fault register and sequencer indicates when any one of a plurality of power supplies develops a fault. The register indicates which power supply has developed the fault and the type of fault developed and provides a signal which causes the sequencer to shut down the power supplies in a desired sequence.

CROSS REFERENCE TO RELATED APPLICATIONS

The fault register and sequencer disclosed in this application is useful with a power supply such as a switching regulator. A switching regulator of the type discussed herein is disclosed in the United States patent application by Luther L. Genuit, filed Nov. 1, 1966, Ser. No. 591,204, now abandoned, entitled "Switching Regulator," which is assigned to the same assignee as the present invention.

BACKGROUND OF THE INVENTION

This invention relates to power supplies and more particularly to circuits which monitor power supplies to detect faults in the supplies and which shut down the supplies in a predetermined sequence when such faults occur.

In high speed data processing systems, microcircuits are used to reduce the physical size of the system and to increase the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet using discrete components when the two cabinets have the same physical size. In addition, high speed microcircuits usually use a much smaller value of D.C. voltage than circuits employing discrete components. For example, in many high speed microcircuits the required D.C. voltage may be less than 1 volt. This voltage must be well regulated to provide a constant value of D.C. voltage for the microcircuits, otherwise variations in D.C. voltage may produce error signals in the data processing system.

The power supplied to any system is a product of the voltage and current so that a power distribution system must supply either a large value of current at a relatively small voltage or a smaller value of current at a relatively large voltage in order to provide a large amount of power. In many of the prior art power supplies, power from a 220 A.C. line is converted into relatively small values of D.C. voltage and large amounts of current are distributed by large conductors or "bus" bars to various portions of the data processing system. The voltage drop in each bus bar is proportional to the amount of current in the bus bar so that the value of voltage supplied to each portion of the data processing system varies as current supplied to that portion varies. This variation in voltage may produce error signals in the data processing system.

A recently developed switching regulator type of power supply elleviates the disadvantages of the prior art by converting an A.C. voltage to a relatively large value of unregulated D.C. voltage. This D.C. is distributed at a relatively large voltage but low current to various portions of the data processing system thereby allowing the use of relatively small conductors. A "standby" power supply comprising a plurality of batteries can be employed to supply the relatively large value of D.C. voltage in the event of the failure of the voltage on the A.C. line. This relatively large value of unregulated D.C. can be converted to a relatively small value of D.C. voltage by switching regulators which are positioned at a plurality of locations in the data processing system. The switching regulator has an efficiency which is several times the efficiency of prior art power supplies employing series regulators thereby causing the physical size of the switching regulator to be relatively small and allowing a plurality of these switching regulators to be positioned throughout the data processing system. Each of the switching regulators may be positioned near the circuit modules to which it is connected so that relatively short conductors may be used between the switching regulator and the modules. The amount of current in each of the conductors is relatively small causing the voltage drop in each of the conductors to be small.

When any of the power supplies develops a fault or when the data processing system develops a fault which causes an appreciable change in the voltage or current in any of the switching regulator power supplies, it is important that the power supplies be disabled or shut down to prevent a change in voltage from causing error signals to develop in the data processing system. When the voltage from a power supply decreases below a first predetermined value or increases above a second predetermined value, the power supply is said to have a loss of regulation. It is important that a register or indicator be used to indicate which of the power supplies loses regulation and also to indicate the type of fault which caused the loss of regulation. The switching regulator power supplies may be widely scattered throughout a large data processing system so that it is difficult to check the operation of all of the power supplies. It is important that indicating devices be connected to each of the power supplies to indicate any faults which develop and that these indicating devices be grouped together for easy access.

It is, therefore, an object of this invention to provide a register which indicates when any one of the plurality of power supplies is defective.

Another object of this invention is to provide a register which indicates which one of a plurality of power supplies is defective.

A further object of this invention is to provide a register which indicates when any one of the plurality of power supplies loses regulation.

Another object of this invention is to provide a register which indicates which one of a plurality of power supplies loses regulation.

A further object of this invention is to provide a register which indicates the type of fault in a defective power supply.

A still further object of this invention is to provide a sequencer which disables all the power supplies in a system when any one of the power supplies develops a fault.

A still further object of this invention is to provide a register that indicates which one of a plurality of power supplies developed the fault which caused the sequencer to disable all the power supplies.

SUMMARY OF THE INVENTION

The foregoing objects are achieved in the instant invention by providing a new and improved fault register and sequencer for indicating the type of fault which develops, and for disabling the power supplies when a fault develops in any one of the supplies.

The register uses a plurality of silicon controlled rectifiers each connected to a corresponding one of a plurality of indicating devices. The rectifiers receive signals from the power supplies and provide voltages to the indicating devices to indicate the type of fault and the power supply in which the fault has occurred.

Other objects and advantages of this invention will become apparent from the following description when taken in connection with the accompanying drawing.

BRIEF DESCRIPTION OF THE DRAWING

The drawing is a schematic of an embodiment of the instant invention.

DESCRIPTION OF THE PREFERRED EMBODIMENT

Referring more particularly to the drawing by the characters of reference, the drawing discloses a fault register and sequencer which is designed to control start-up and shut-down of the power supplies in a data processing system and to indicate when there is a loss of regulation in any of these power supplies. As indicated in the drawing, the register and sequencer comprises an AND-gate 10, a switching means 11, an error-location register 12, a type-of-fault register 13, a disable switch 14, and ready relay circuit 15 and a shut-down circuit 16. AND-gate 10 has a plurality of input leads 18a–18n each of which is attached to a corresponding one of a plurality of ready-signal terminals 21a–21n of the power supplies 22a–22n. When a positive signal is present at each of the ready-signal terminals 21a–21n, the AND-gate 10 provides a positive output signal at the output lead 19. The output lead 19 of AND-gate 10 is connected to an input terminal 24 of switching means 11. A positive signal on output lead 19 and on input terminal 24 causes silicon controlled rectifier 25 to be rendered conductive.

The silicon controlled rectifier is a semiconductor device having an anode, a cathode and a gate. The silicon controlled rectifier can be used as an ON-OFF switch which can be turned in a very few microseconds. Normally, the silicon controlled rectifier cannot conduct current between anode and cathode thereof until a pulse of current larger than a threshold value flows from gate to cathode. If a positive voltage difference exists between the anode and the cathode, when the pulse of current flows from the gate, the silicon controlled rectifier "fires"; i.e., is rendered conductive and the current will flow from anode to the cathode. Once anode-cathode flow commences, the gate has no further control over such current flow. Current flow from anode to cathode of the silicon controlled rectifier can be terminated only by reducing the anode to cathode current below a "holding" or minimum current value. The rate at which the anode to cathode voltage of the rectifier increases must be limited to prevent the rectifier from firing when no gate to cathode current is applied. A more detailed description of the operation of the silicon controlled rectifier can be found in the "Silicon Controlled Rectifier Manual," Third Edition, 1964, published by the General Electric Company, Auburn, N.Y.

When it is desired to supply power to a data processing system, a "D.C.-ON" switch 64 is closed causing 24 volts to be applied to a delay circuit comprising resistor 65 and capacitor 66. Resistor 65, capacitor 66 and the 24 v. supply cause the voltage across capacitor 66 to increase at exponential rate and prevents the sudden application of full voltage to the fault register and sequencer. This reduces the rate of increase of voltage on line 92 and prevents the silicon controlled rectifiers which are connected to line 92 from firing when switch 64 is closed.

At the same time the D.C.-ON switch is closed, a plurality of switches (not shown) are closed to supply input power to each of the power supplies 22a–22n. Each of these power supplies is equipped with an over-voltage detection circuit, an under-voltage detection circuit and an over-current detection circuit. The circuits are designed and connected in a manner to provide a ready signal to the ready-signal terminal 21 in each of the power supplies when the values of voltage and current from the supply are within acceptable limits. When the signal is provided to each of the ready-signal terminals 21a–21n the AND-gate 10 provides a positive voltage at the output lead 19. This positive voltage at the output lead 19 supplies a positive current from gate to cathode of silicon controlled rectifier 25 thereby rendering silicon controlled rectifier 25 conductive.

Register 30 is connected between the anode of silicon controlled rectifier 25 and the control electrode or base of transistor 26. The first output electrode or emitter of transistor 26 is connected to line 92 and the second output electrode or collector of transistor 26 is connected to an output terminal 27 of switching means 11. When silicon controlled rectifier 25 is rendered conductive, current flows from the emitter to base of transistor 26, through register 30, through anode to cathode of silicon controlled rectifier 25 to ground, thereby rendering transistor 26 conductive. When transistor 26 is rendered conductive, current flows from line 92 through emitter to cathode of transistor 26 causing a positive voltage to appear at a first output terminal 27 thereby providing a voltage to registers 12 and 13, to the switch 14 and to the circuits 15 and 16.

The positive voltage at output terminal 27 of the switching means 11 provides a positive voltage to the emitter of transistor 58. The base of transistor 58 is returned to ground through silicon controlled rectifier 25 when silicon controlled rectifier 25 is rendered conductive. A current flows from treminal 27 to the emitter of transistor 58, from emitter to base of transistor 58, through resistor 62, diode 61, and resistor 31, through silicon controlled rectifier 25 to ground. The emitter to base current renders transistor 58 conductive so that a current flows from terminal 27, through emitter to collector of transistor 58 where the current divides. One portion of the current flows through lamp 60 and another portion of the current flows through the coil of relay 59 to ground. The current through the coil of relay 59 energizes relay 59 and enables logic in the data processing system. The current through lamp 60 causes lamp 60 to light, thereby indicating that the power supplies are operating properly and that the logic in the data processing system (not shown) has been enabled.

The error-location register 12 includes a plurality of lamps or indicating devices 34a–34n and a plurality of silicon controlled rectifiers 35a–35n. A plurality of signal-input terminals 36a–36n are each coupled to the gate of a corresponding one of the silicon controlled rectifiers 35a–35n. The signal-input terminals 36a–36n are also connected to a corresponding one of the plurality of fault-signal terminals 38a–38n which are connected to power supplies 22a–22n. When the output voltage decreases below a predetermined threshold value in any of the power supplies, a positive voltage is applied to the corresponding fault terminal 38a–38n which in turn applies a voltage to the corresponding signal-input terminal 36a–36n of the error-location register 12. The positive voltage at the input terminal 36 causes the corresponding silicon controlled rectifier 35 to be rendered conductive so that current through the lamp 34 and through the silicon controlled rectifier 35 causes the lamp to light, thus indicating which power supply is defective. The current through silicon controlled rectifier 35 flows through resistor 39 to ground. The current through resistor 39 provides a voltage drop of the polarity shown in the diagram and provides a positive voltage to input terminal 44 of the type-of-fault register 13.

When any one of the silicon controlled rectifiers 35 is rendered conductive, the positive voltage at the upper end of resistor 39 produces a positive voltage at the cathodes of the other silicon controlled rectifiers 35 and prevents them from being rendered conductive. This prevents more than one lamp 34 from being energized at one time and aids in determining which of the power supplies 22a–22n has a fault.

The type-of-fault register 13 includes a pair of lamps or indicating devices 42 and 43 and a pair of silicon controlled rectifiers 45 and 46. The gate of silicon controlled rectifier 45 is coupled to the upper end of resistor 39 so that when any of the silicon controlled rectifiers 35a–35n is rendered conductive, the positive voltage at the upper end of resistor 39 is applied to terminal 44 of register 13. The positive voltage at the input terminal 44 causes silicon controlled rectifier 45 to be rendered conductive so that a current flows through the indicating lamp 42 thereby causing lamp 42 to light which indicates that there is a loss of regulation in one of the power supplies.

When any of the power supplies provides more than a predetermined threshold value of current, a positive voltage appears at the corresponding one of the over-current terminals 50a–50n. This voltage at the over-current terminal is applied to an input terminal 47 of the over-current sensor comprising lamp 43 and silicon controlled rectifier 46. The positive voltage at terminal 47 causes the silicon controlled rectifier 46 to be rendered conductive so that current flows from terminal 27 through lamp 43, silicon controlled rectifier 46 and resistors 49 and 48 to ground. This current causes lamp 43 to glow which indicates that there is an over-current in one of the power supplies. The current through resistor 48 produces a voltage drop of the polarity shown across resistor 48 and produces a positive voltage at the cathode of silicon controlled rectifier 45. The positive voltage at the cathode of rectifier 45 prevents rectifier 45 from being rendered conductive and prevents lamp 42 from being energized at the same time lamp 43 is energized.

When a loss of regulation occurs in any of the power supplies or when an over-current condition occurs in any of the power supplies, all of the power supplies are shut down. A positive voltage at the upper end of resistor 48 provides a signal which causes the power supplies to be shut down. The positive voltage at the upper end of resistor 48 causes a positive voltage to be applied to a signal-input terminal 52 of disable switch 14 and causes silicon controlled rectifier 54 to be rendered conductive. When silicon controlled rectifier 54 is rendered conductive, current flows from junction point 88 through resistors 72 and 73 and silicon controlled rectifier 54 to ground. The current through resistor 72 produces a voltage drop of the polarity shown and causes a decrease in the voltage at the base of transistor 55. The decrease in voltage at the base of transistor 55 causes current to flow from emitter to base of transistor 55 thereby rendering transistor 55 conductive. When transistor 55 is rendered conductive, the voltage on the collector of transistor 55 and at junction point 56 is positive. The positive voltage at junction point 56 renders a transistor 58 nonconductive so that the lamp 60 and the ready relay 59 are de-energized. When relay 59 is de-energized, the logic in the data processing system is disabled. The positive voltage on the cathode of transistor 55 causes a current to flow through resistor 74 to the upper plate of capacitor 75, from the lower plate of capacitor 75 to ground thereby charging capacitor 75 to the polarity shown. The voltage on capacitor 75 renders unijunction transistor 77 conductive.

A unijunction transistor is a semiconductor device having a first base or "base-one," a second base or "base-two" and an emitter. If a positive voltage difference exists between base-two and base-one, the unijunction transistor cannot conduct current between the emitter and base-one until a voltage greater than a first predetermined threshold or "peak point voltage" value exists between the emitter and base-one. When the voltage on the emitter is more than the peak point voltage, current flows from emitter to base-one until the emitter voltage decreases below a second predetermined or "valley voltage" value. A more detailed description of a unijunction transistor can be found in chapter 13 of the Transistor Manual, seventh edition, 1964, published by the General Electric Company, Syracuse, N.Y.

When capacitor 75 charges to the peak point voltage, the unijunction transistor 77 is rendered conductive. When unijunction transistor 77 is rendered conductive, current flows from the upper plate of capacitor 75 through emitter to base-one of transistor 77 and resistor 79 to ground thereby providing a voltage drop of the polarity shown across resistor 79. The voltage across resistor 79 provides a positive voltage at the gate of silicon controlled rectifier 81 thereby rendering rectifier 81 conductive. When rectifier 81 is rendered conductive, a current flows from junction point 91 through the D.C. fault relay 85 and rectifier 81 to ground thereby energizing the D.C. fault relay. When the D.C. fault relay is energized, power is removed from the switching regulator power supplies 22a–22n, but power is not removed from the fault register and sequencer shown in the drawing. Thus, lamp 43 will continue to be energized so that the over-current condition can be noted. The power supply which develops the over-current signal will be shut down by a circuit in the defective power supply before relay 85 is energized. When a power supply is shut down, a signal is supplied to the terminal 38 of that supply and the corresponding lamp 34 is energized as described above to indicate which power supply has the over-current condition. A capacitor 40 connected to the cathodes of the silicon controlled rectifiers 35 delays the application of a positive voltage to the input terminal 44 of the type-of-fault circuit 13. The voltage across resistor 48, due to current through lamp 43 and rectifier 46, prevents rectifier 45 from being rendered conductive and prevents the register from indicating more than one type of fault.

When it is desired to shut down the data processing system, the "D.C.-OFF" button 68 is pressed thereby providing a positive voltage at junction point 69. The voltage at junction point 69 causes a current to flow through resistor 70 and the resistor 71 to ground thereby providing a voltage of the polarity shown across resistor 71 and providing a positive voltage at the gate of silicon controlled rectifier 54. The positive voltage at the gate of silicon controlled rectifier 54 causes a current to flow from gate to cathode of rectifier 54 thereby rendering rectifier 54 conductive. When rectifier 54 is rendered conductive, a current flows from the emitter to the base of transistor 55, through a resistor 73 and silicon controlled rectifier 54 to ground thereby rendering transistor 55 conductive. When transistor 55 is rendered conductive, the voltage at the collector of transistor 55 is substantially the same as the voltage at the emitter of transistor 55 so that the voltage at a junction point 56 is now positive, thereby causing transistor 58 to be rendered nonconductive. When transistor 58 is rendered nonconductive, the relay 59 and lamp 60 are de-energized. When transistor 55 is rendered conductive, the positive voltage at the collector causes a capacitor 75 to be charged, to the polarity shown, through resistor 74. Resistor 74, capacitor 75 and unijunction transistor 77 provide a delay so that shutdown will not occur for about 30 milliseconds. When capacitor 75 charges to the peak point voltage, the unijunction transistor 77 is rendered conductive. Current flows from the upper plate of capacitor 75 through emitter to base-one of transistor 77 and resistor 79 to ground thereby providing a voltage drop of the polarity shown across resistor 79. The voltage across resistor 79 provides a positive voltage at the gate of silicon controlled rectifier 81 thereby rendering silicon controlled rectifier 81 conductive. When silicon controlled rectifier 81 is rendered conductive, a current flows from the +24 volts through the switch 68, diode 82, the D.C.-OFF relay 83 and silicon controlled rectifier 81 to ground thereby energizing the D.C.-OFF relay 83 and causing power to be removed from the data processing system.

While the principles of the invention have now been made clear in an illustraitve embodiment, there will be immediately obvious to those skilled in the art, many modifications of structure, arrangement, proportions, the elements, materials, and components, used in the practice of the invention, and otherwise, which are particularly adapted for specific environments and operating requirements without departing from those principles. The appended claims are, therefore, intended to cover and embrace any such modifications, with the limits only of the true spirit and scope of the invention.

What is claimed is:

1. A fault register and sequencer for use with a plurality of power supplies comprising: a plurality of indicators, said indicators being divided into first and second groups, each of said indicators having a signal-input terminal and an output indicating device; a source of voltage; switching means for connecting said source of voltage to said indicators when all of said power supplies provide a regulated value of output voltage, said switching means being connected between said source and each of indicators; means for supplying a signal to said signal-input terminal of a predetermined one of said indicators of said first group when a corresponding one of said power supplies loses regulation so that said indicating device indicates which one of said supplies loses regulation; and means for supplying a signal to a selected one of said signal-input terminals of said indicators in said second group when one of said power supplies loses regulation, the type of fault which causes said supply to lose regulation determining the terminal to which said signal is supplied.

2. A fault register and sequencer as defined in claim 1 including: means for disabling all of the power supplies when a fault causes any one of said power supplies to lose regulation, said means for disabling being coupled to each of said power supplies.

3. A fault register and sequencer for use with a data processing system having a plurality of power supplies, said register and sequencer comprising: a plurality of indicators, said indicators being divided into first and second groups, each of said indicators having a signal-input terminal and an output indicating device; a source of voltage; switching means for connecting said source of voltage to said indicators when all of said power supplies provide a regulated value of output voltage, said switching means being connected between said source and each of said indicators; means for supplying a signal to said signal-input terminal of a predetermined one of said indicators of said first group when a corresponding one of said power supplies loses regulation so that said indicating device indicates which one of said supplies loses regulation; means for enabling logic in said data processing system when all of said power supplies provide a regulated value of output voltage and for disabling the logic in said data processing system when any of said power supplies loses regulation, said means for enabling being coupled to said indicators; and means for supplying a signal to a selected one of said signal-input terminals of said indicators in said second group when one of said power supplies loses regulation, the type of fault which causes said supply to lose regulation determining the terminal to which said signal is supplied.

4. A fault register and sequencer as defined in claim 3 including: means for disabling all of the power supplies when a fault causes any one of said power supplies to lose regulation, said means for disabling being coupled to each of said power supplies.

5. A fault register for use with a plurality of power supplies each having a fault-signal terminal, a ready-signal terminal and an over-current terminal, said register comprising: a plurality of controlled rectifiers, each having a cathode, a gate and an anode, said rectifiers being divided into first and second groups; first and second reference potentials; a plurality of indicating devices each having first and second terminals, said first terminal of each of said devices being connected to said anode of a corresponding one of said rectifiers; a switching means having a signal-input terminal, said switching means being connected between said first potential and said second terminal of each of said devices; first and second resistors, said first resistor being connected between said second potential and said cathode of each of said rectifiers in said first group, said second resistor being connected between said second potential and said cathode of each of said rectifiers in said second group, said gate of a first rectifier in said second group being coupled to said cathodes of the rectifiers in said first group; and a plurality of input terminals, each of said input terminals being coupled to said gate of a corresponding one of said rectifiers.

6. A fault register for use with a plurality of power supplies as defined in claim 5 wherein said switching means includes: a silicon controlled rectifier, having a cathode, a gate and an anode; and a transistor, having a control electrode and first and second ouptut electrodes, said first output electrode of said transistor being connected to said first potential, said second output electrode of said transistor being connected to said second terminal of each of said indicating devices, said control electrode of said transistor being coupled to said anode of said silicon controlled rectifier, said cathode of said silicon controlled rectifier being connected to said second potential, said gate of said silicon controlled rectifier being coupled to said signal-input terminal.

7. A fault register for use with a plurality of power supplies as defined in claim 5 including: an AD-gate having an output terminal and a plurality of input terminals, said output terminal of said gate being connected to said signal-input terminal of said switching means, each of said input terminals of said gate being coupled to said ready-signal terminal of a corresponding one of said power supplies.

8. A fault register and sequencer for use with a plurality of power supplies each having a fault-signal terminal, a ready-signal terminal and an over-current terminal, said register comprising: a plurality of controlled rectifiers, each having a cathode, a gate and an anode, said rectifiers being divided into first, second and third groups; first and second reference potentials; a plurality of indicating devices each having first and second terminals, said anode of each of said rectifiers in said first and said second groups being connected to a first terminal of a corresponding one of said indicating devices; a first transistor having a control electrode, and first and second output electrodes, said second output electrode of each transistor being connected to said second terminal of each of said indicating devices, said first output electrode of said transistor being coupled to said first potential, said control electrode of said transistor being coupled to said anode of a rectifier in said third group, said cathode of said rectifier in said third group being connected to said second potential; first and second resistors, said first resistor being connected between said second potential and said cathode of each of said rectifiers in said first group, said second resistor being connected between said second potential and said cathode of each of said rectifiers in said second group, said gate of a first rectifier in said second group being coupled to said cathodes of the rectifiers in said first group; means for coupling said gate of a second rectifier in said second group to said over-current terminal of each of said supplies; an AND-gate having an output terminal and a plurality of input terminals, said output terminal of said AND-gate being coupled to said gate of said rectifier in said third group; and means for coupling each of said input terminals of said AND-gate to a corresponding one of said ready-signal terminals of said power supplies, each of said fault-signal terminals of said supplies being coupled to said gate of a corresponding one of said rectifiers in said first group.

9. A fault register and sequencer as defined in claim 8 including: a second transistor having a control electrode and first and second output electrodes; a relay means, said relay means being connected between said second output electrode of said second transistor and said second potential, said first output electrode of said second transistor being connected to said second output electrode of said first transistor, said control electrode of said second transistor being coupled to said anode of said rectifier in said third group.

10. A fault register and sequencer as defined in claim 8 including: a second transistor having a control electrode and first and second output electrodes; a relay means, said relay means being connected between said second output electrode of said second transistor and said second potential, said first output electrode of said second transistor being connected to said second output electrode of said first transistor, said control electrode of said second transistor being coupled to said anode of said rectifier in said third group; and a disable switch, said disable switch being connected between said control electrode of said second transistor and said cathodes of said rectifiers in said second group, said disable switch providing a signal to render said second transistor nonconductive when any of said rectifiers in said second group are rendered conductive.

11. A register and sequencer as defined in claim 8 including a shutdown circuit comprising: a unijunction transistor having an emitter and a first and second base; an additional silicon controlled rectifier having a cathode, an anode and a gate; a delay circuit having an input lead and an output lead; a relay; and a disable switch, said disable switch being connected between said cathodes of said rectifiers in said second group and said input lead of said delay circuit, said disable switch providing a signal to said input lead of said delay circuit when any of said rectifiers in said second group are rendered conductive, said output lead of said delay circuit being connected to said emitter of said unijunction transistor, said second base of said unijunction transistor being coupled to said first potential, said first base of said unijunction transistor being coupled to said gate of said additional rectifier, said relay being connected between said anode of said additional rectifier and said first potential, said cathode of said additional rectifier being connected to said second potential.

12. A fault register and sequencer as defined in claim 8 including: a second transistor having a control electrode and first and second output electrodes; first and second relay means, said first relay means being connected between said second output electrode of said second transistor and said second potential, said first output electrode of said second transistor being connected to said second output electrode of said first transistor, said control electrode of said second transistor being coupled to said anode of said rectifier in said third group; a disable switch, said disable switch being connected between said control electrode of said second transistor and said cathodes of said rectifiers in said second group, said disable switch providing a signal to render said second transistor nonconductive when any of said rectifiers in said second group are rendered conductive; and a shutdown circuit comprising: a unijunction transitsor having an emitter and a first and second base; an additional silicon controlled rectifier having a cathode, an anode and a gate; and a delay circuit, said delay circuit being connected between said disable switch and said emitter of said unijunction transistor, said second base of said unijunction transistor being coupled to said first potential, said first base of said unijunction transistor being coupled to said gate of said additional rectifier, said second relay means being connected between said anode of said additional rectifier and said first potential, said cathode of said additional rectifier being connected to said second potential.

References Cited
UNITED STATES PATENTS

| | | | |
|---|---|---|---|
| 2,756,409 | 7/1956 | Lubkin | 340—413 |
| 2,901,739 | 8/1959 | Freitas | 340—413 |
| 3,225,257 | 12/1965 | Fegley | 340—248X |
| 3,440,524 | 4/1969 | De Jarld et al. | 340—223X |

DONALD J. YUSKO, Primary Examiner

D. MYER, Assistant Examiner

U.S. Cl. X.R.
317—33; 340—223